US006942272B2

United States Patent
Livingston

(10) Patent No.: US 6,942,272 B2
(45) Date of Patent: Sep. 13, 2005

(54) TAILGATE STEP

(76) Inventor: Thomas John Livingston, 253 Yummerdan Rd., Lititz, PA (US) 17543

( * ) Notice: Subject to any disclaimer, the term of this patent is extended or adjusted under 35 U.S.C. 154(b) by 105 days.

(21) Appl. No.: 10/650,853

(22) Filed: Aug. 29, 2003

(65) Prior Publication Data
US 2005/0046219 A1 Mar. 3, 2005

(51) Int. Cl.⁷ ............................................... B62D 33/03
(52) U.S. Cl. ........................................ 296/62; 296/57.1
(58) Field of Search .................................. 296/57.1, 62

(56) References Cited

U.S. PATENT DOCUMENTS

| 4,639,032 A | | 1/1987 | Barbour | |
|---|---|---|---|---|
| 4,846,487 A | * | 7/1989 | Criley | 296/62 |
| 5,732,996 A | * | 3/1998 | Graffy et al. | 296/62 |
| 6,364,392 B1 | * | 4/2002 | Meinke | 296/62 |
| 2002/0070577 A1 | | 6/2002 | Pool, III et al. | |

* cited by examiner

Primary Examiner—Jason Morrow
(74) Attorney, Agent, or Firm—Bruce E. Weir

(57) ABSTRACT

A tailgate has a least one step held in a working position between tailgate level and ground level by one or more supports. Each support is attached at its upper end to a hinge. Each hinge is attached to or integral with an end of a support channel embedded in the upper surface of a lowered tailgate. Each support member channel is normal to and communicates with a step channel embedded at or near the bottom edge of the tailgate. The step and supports are sized and configured to pivot on the hinges and be stored within the corresponding channels, so that the upper surface of the tailgate is flat when the tailgate step is stored. The channels may be formed into or affixed to the tailgate by methods that prevent the entry of contaminants into the interior of the tailgate.

9 Claims, 5 Drawing Sheets

TAILGATE STEP

BACKGROUND

The pickup truck is one of the world's most widely-used utility vehicles. The pickup's boxlike bed can be adapted to carry an almost limitless variety of cargoes. The rear sidewall of the bed is usually a drop-down tailgate that provides both immediate access to the entire width of the bed and a convenient working surface for tradesmen, farmers, ranchers, and other users.

Nevertheless, one glaring deficiency of the pickup truck is the awkwardness of loading and unloading cargo. The bed itself is above knee level and the top of a sidewall may be at chest level. If the bed is uncovered, lightweight items can be lifted over a sidewall. However, heavy items are usually dragged into or out of the rear of the vehicle, over the tailgate. If the bed is covered, as is commonly done for weather protection and security, every item must cross the tailgate.

A person moving cargo in or out of a pickup bed is therefore often forced to crawl or slide over the tailgate in an unnatural posture while carrying a significant amount of weight. Such actions can cause serious and permanent back and joint injuries. Even in the absence of injury, repeatedly entering and exiting a pickup bed can be exhausting and time-consuming.

The awkwardness and strain of loading and unloading a pickup bed can be reduced by providing a step that allows a user to remain upright while stepping up onto the tailgate. Many users have carried step stools, step ladders, and other such devices for this purpose. However, a stool or ladder may be of insufficient height or strength, difficult to position securely on uneven ground, inadvertently kicked out of position, and may become just another annoying, hard-to-reach piece of junk rattling around in the back of the vehicle.

A step that is attached to a tailgate provides a more elegant solution to the problem. Many such steps are known in the art. Most fold against the tailgate by rotating about fixed pins. Several are aftermarket add-ons that bolt or screw to the top edge of the existing tailgate. While these are relatively easy to install on existing tailgates, they protrude from a tailgate even when not in use and some concentrate all loads on two small, unreinforced attachment points. A tradesman carrying a full load of equipment and material can exceed 300 pounds, and when this force is leveraged through the frame of a step against fasteners attached only to relatively soft vehicle body metal, the result can be catastrophic failure.

Building a tailgate step into a tailgate can reduce the profile of a step when the step is not in use. A typical built-in step is designed to retract into the tailgate, usually on rails or within tubes through the top edge of the tailgate. However, the cross-section and shape of a tailgate often places restrictions on the size and strength of a step mechanism that can be installed within the tailgate. A retractable tailgate step that dangles freely from the edge of a tailgate can be dangerous for a user, but a tailgate step designed to be rigid when in service usually places great stress upon relatively small rails and sliding hinge pins.

Additionally, a tailgate on a working vehicle may be repeatedly doused with water, paint, corrosive solutions and compounds, particulate matter, and a wide variety of other substances that may jam rails and other closely-fitted mechanical parts. Installation of such mechanisms within the interior of a tailgate also creates internal cavities and passages that allow contaminants to enter the tailgate and collect in places where they cannot easily be removed, accelerating structural damage to the tailgate.

SUMMARY

The present invention remedies the defects of existing tailgate steps with a simple folding step that pivots on at least one high-strength hinge built into the upper edge of a tailgate. The hinge is affixed to the tailgate in a manner that distributes a load on the step over a large portion of the tailgate. One end of at least one support member is attached to the hinge. The other end of the support member is rigidly attached to a step member.

The step and support members pivot about the hinge as a unit between a working position and a stored position. In the working position, the support member rests against a load-bearing surface that rigidly holds the support member at an angle sloping downward from the tailgate. The step member is therefore rigidly held behind the tailgate at a convenient level between the tailgate and the ground.

The tailgate has storage channels formed or installed into its upper surface, which is the surface facing upward when the tailgate is open. The storage channels are shaped to accept the support member and the step member. In the stored position the support member and the step member pivot back to the upper surface of the tailgate and fit within the channels to minimize the portion of the tailgate step that protrudes from the tailgate.

A preferred embodiment of the tailgate step has two hinges and a support member attached to each hinge. Each hinge is affixed within the upper edge of the tailgate. The hinge attachment assembly reinforces the upper edge of the tailgate and distributes loads carried by the step and support members.

The free end of each support member is rigidly attached to the step member. An alternate embodiment may include one or more additional step members arrayed and attached in ladder fashion between the lowest step member and the tailgate.

In a preferred embodiment, the storage channel is press-formed into the upper surface of the tailgate to a sufficient depth to allow the tailgate step to be completely contained within the channels while in the stored position. The storage channels open only to the upper surface of the tailgate, allowing the channels to be easily cleaned and providing no passages that allow contaminants to enter the interior of the tailgate.

Optionally, the lowest step member may include a handle to allow the step member to be easily withdrawn from the storage channels. A catch or clasp may be installed on the step member or corresponding edge of a storage channel to retain the stored tailgate step.

The present invention generally provides a rigid tailgate step that can safely bear the weight of a large person carrying a full load of tools and materials. When stored, the present invention is contained within the storage channels, restoring the flat profile of the upper surface of the tailgate. The hinges and channels reinforce the tailgate without allowing the entry of contaminants that would damage the tailgate.

All of these features and advantages of the present invention, and more, are illustrated below in the drawings and detailed description that follows.

DETAILED DESCRIPTION

Figure 1:
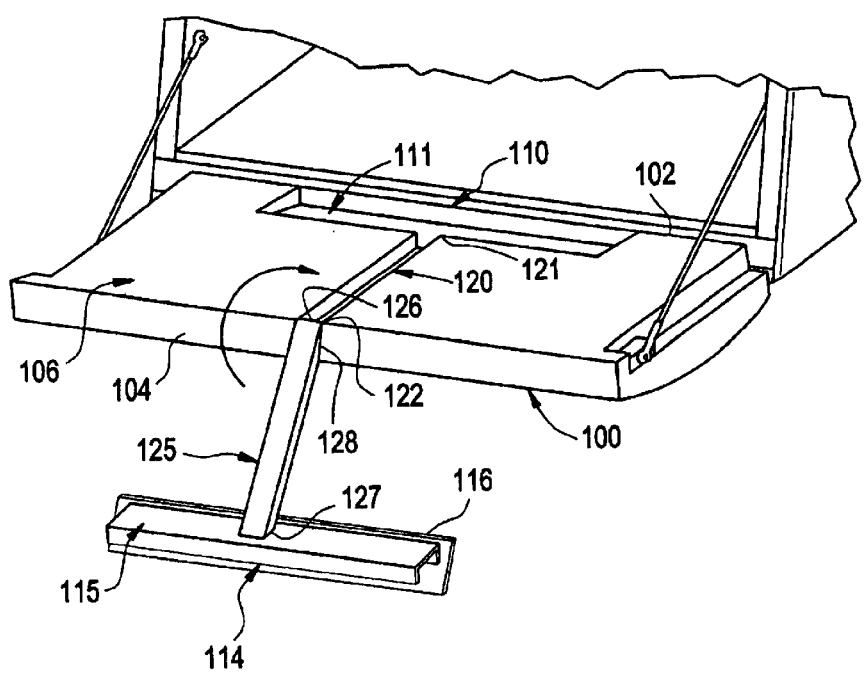
FIG. 1 shows a perspective view of an embodiment of the present invention having a single support member.

FIG. 1 shows a perspective view of an embodiment of the present invention having a single support member. A tailgate 100 attached to a pickup truck or other vehicle has a step member channel 110, a support member channel 120, and a hinge 128 manufactured or installed within the tailgate 100. In a preferred embodiment of the present invention the step member channel 110 is substantially parallel to and located at or near the bottom edge 102 of the tailgate 100.

The support member channel 120 is substantially normal to the bottom edge 102 of the tailgate 100. The lower end 121 of the support member channel 120 communicates with the step member channel 110. The upper end 122 of the support member channel 120 creates an opening in the upper edge 104 of the tailgate 100. In a preferred embodiment of the present invention the upper end 122 of the support member channel 120 is reinforced and transversely drilled to accept a hinge pin (not visible), thereby forming a portion of the hinge 128.

The step member channel 110, the support member channel 120, and a portion of the hinge 128 may be formed during the original tailgate manufacturing process, using metal pressing and welding methods well-known in the art. The step member channel 110, the support member channel 120, and a portion of the hinge 128 may also be retrofitted within existing tailgates by cutting and welding techniques known in the art.

In one embodiment of the present invention, steel or aluminum channel stock with a rectangular "U" cross-section is selected and cut to suitable lengths. Slots to accept the channel sections are cut into the upper surface of an existing tailgate with an abrasive disk saw, cutting torch, or other cutting tool known in the art. A slot the size and shape of the inner walls of a cross-section of the support member channel 120 is cut into the side of the step member channel 110 in a suitable location and the bottom end 121 of the support member channel 120 is positioned and butt-welded around the slot.

The channels and support members may be made of metals, plastics, composites, and other materials known in the art, and may have semi-circular, triangular, and other cross-sections as deemed suitable for particular applications.

Optionally, hinge reinforcing plates may be welded around the upper end 122 of the support member channel 120, and end plates may be welded to the open ends of the step member channel 110. The assembled channels are inserted into the slots in the tailgate 100 and affixed by welds, bolts, or other means known in the art. In preferred embodiments, joints between the channels and the tailgate are sealed by welding, bonding agents, and/or sealants to prevent the entry of contaminants into the interior of the tailgate 100.

A support member 125 is attached to the hinge 128. In a preferred embodiment the support member 125 is a metal tube with a square cross-section, sized to fit within the support member channel 120. The upper end 126 of the support member 125 is transversely drilled to accept a hinge pin (not visible) and is inserted within the upper end 122 of the support member channel 120. The holes in the upper end 126 of the support member 125 are aligned with the holes in the upper end 122 of the support member channel 120 and a hinge pin is inserted, forming the hinge 128. The hinge pin may be a metal rod, cotter pin, or other elongated fastening member as is known in the art, and may be affixed by deformation, welding, bonding, one or more fasteners, or other means known in the art.

The lower end 127 of the support member 125 is attached to a step member 114 by welding, bolting, or other means known in the art. In a preferred embodiment, the step member 114 is a length of rectangular metal channel stock, although tubes, bars, boards, and many other shapes and materials may be used as desired.

FIG. 1 shows this embodiment of the present invention in a working position, with the step member 114 held to the rear of the tailgate 100 at a level between the tailgate 100 and the ground that is convenient for a person attempting to step from the ground to the tailgate 100. The hinge 128 components are configured so that the support member 125 rests against a reinforced contact surface (not shown) in the upper end 122 of the support member channel 120 when the step member 114 is in the working position, thereby holding the support member 125 and the step member 114 rigidly in position.

In a preferred embodiment, the support member is held at a 240 degree angle with respect to the upper surface 106 of the tailgate 100, and the upper surface 115 of the step member 114 is held approximately parallel to the ground surface. The configuration of hinge 128 parts and features and the attachment between the support member 125 and the step member 114 may be modified to change these angles as desired.

When not in use, the step member 114 and support member 125 pivot about the hinge 128 and are stored within the step member channel 110 and the support member channel 120. In a preferred embodiment, all components are sized and configured so that the upper surface 106 of the tailgate 100 presents a flat surface when the step member 114 and support member 125 are in the stored position. The bottom surface 111 of the step member channel 110 may increase in depth as it nears the bottom edge 102 of the tailgate 100 to accommodate the angle between the step member 114 and the support member 125. As shown in FIG. 1, the step member channel 110 may be contained by the bottom edge 102 of the tailgate 100. Alternatively, the step member channel 110 may create an opening in the bottom edge 102 of the tailgate 100.

Optionally, a protective truck bed liner material as is known in the art may be affixed to the upper surface 106 of the tailgate 100. Fitted pieces of the same material may be affixed to the step member 114 and the support member 125 to create a step member cover panel 116 and a support member cover panel (not visible). When the present invention is in the stored position, the step member cover panel 116 and the support member cover panel are flush with the protective liner affixed to the upper surface 106 of the tailgate 100. Additionally, a non-skid material may be affixed to the upper surface 115 of the step member 114 to provide increased traction for a person working in wet conditions. A latch mechanism (not shown) may also be installed to hold the step member in place while in the stored position.

Both the methods of press-forming the channels at the time of original manufacture and retrofit installation into an existing tailgate offer the significant advantage of broad load distribution. Vehicle body parts including tailgates are often made from relatively soft sheet metal. The channels impart considerable added stiffness to a tailgate and effectively distribute the step load across the width of the tailgate, rather than concentrating most of the load at the top edge of the tailgate. Moreover, since the support members are held at an angle and the step member is consequently held at some distance behind the edge of a tailgate when in the working position, the step member is held solidly in a convenient position and can bear a considerable load.

Figure 2:
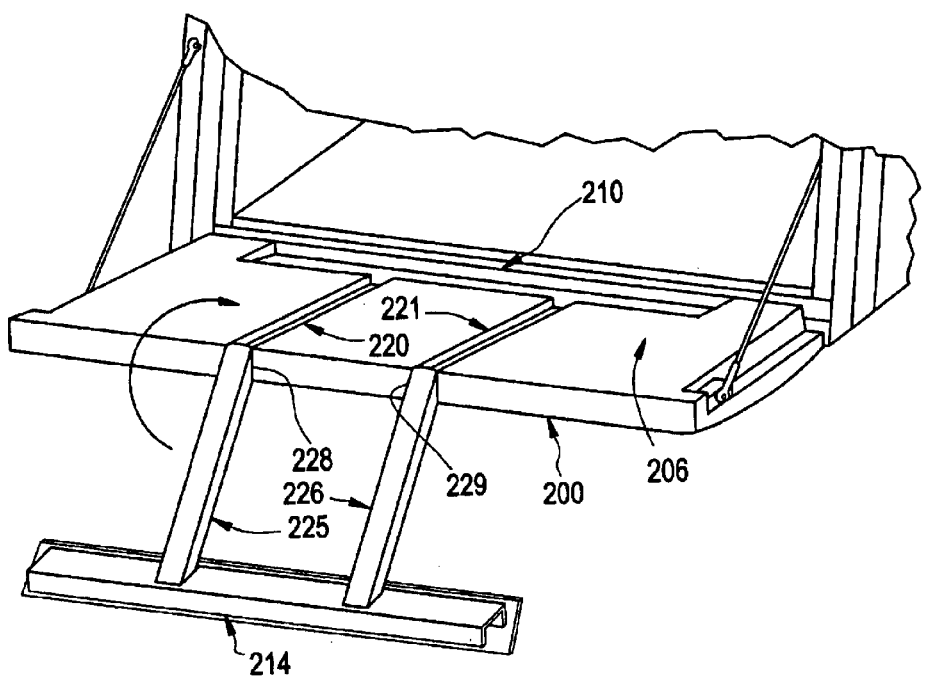
FIG. 2 shows a preferred embodiment of the present invention having two support members.

FIG. 2 shows a preferred embodiment of the present invention having two support members 225, 226. This embodiment is constructed and used in fundamentally the same manner as the embodiment of FIG. 1, with the addition of a second support member for increased stability.

The increased rigidity provided by a second support member allows the use of channels and members with smaller dimensions, allowing manufacturing or installation of channels within thinner tailgates and reducing the weight and expense of the components. In this embodiment, a step member 214 is attached to a pair of support members 225, 226, which are in turn attached through hinges 228, 229 to support member channels 220, 221 that communicate with a step member channel 210 embedded in a tailgate 200. The step member 214 and the support members 225, 226 pivot about the hinges 228, 229 from a working position (shown in FIG. 2) to a stored position in which step and support members are contained within channels.

If additional rigidity is desired, three or more support members may be used. Additional step members and corresponding channels may be employed to reduce the distance between each step, so that a person may move more easily between the ground and tailgate level. Additional step members may be especially desirable for vehicles that are raised from the ground more than usual.

Figure 3:
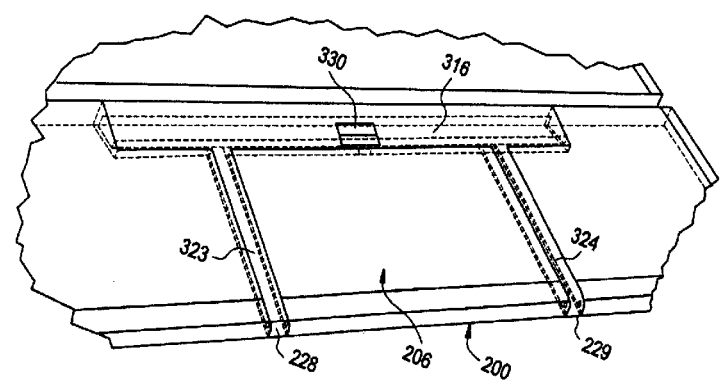
FIG. 3 shows the embodiment of FIG. 2 in a stored position.

FIG. 3 shows the embodiment of FIG. 2 in a stored position. The step member and support members are completely contained within the channels, so that a step member cover panel 316 and support member cover panels 323, 324 are flush with the upper surface 206 of the tailgate 200. The upper surface 206 of the tailgate 200 may be covered with protective bed liner material. A latch 330 or other closure mechanism as is known in the art retains the step member 316 in the stored position. A handle may also be provided to assist in lifting the step member from the step member channel.

Figure 4:
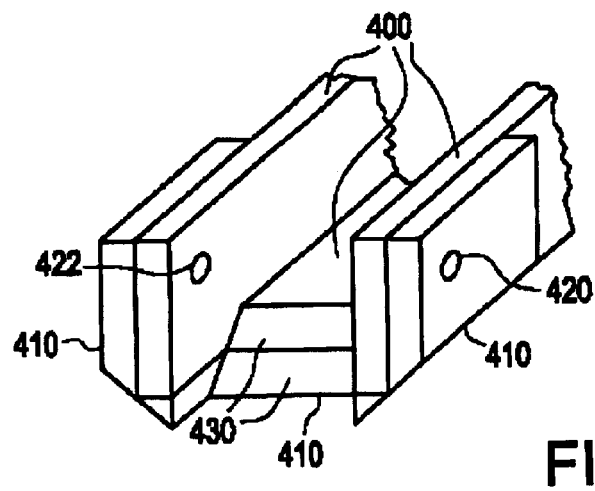
FIG. 4 shows a perspective view of reinforcement means for a hinge end of a support member channel.

FIG. 4 shows a perspective view of reinforcement of a hinge end of a support member channel. A support member channel 400 has one or more additional layers 410 of material welded or bonded to the channel's upper end, providing reinforcement for a hinge. Hinge pin holes 420, 422 are transversely bored through the channel to accept a hinge pin (not shown). The hinge pin holes 420, 422 are positioned with respect to a contact surface 430 so that the contact surface 430 provides a stop to hold a support member at a desired angle. The contact surface 430 is angled to maximize contact area between the contact surface 430 and the top surface of a support member when the present invention is in the working position.

Figure 5:
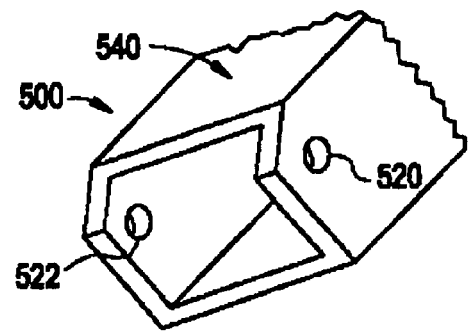
FIG. 5 shows a perspective view of a hinge end of a support member.

FIG. 5 shows a perspective view of a hinge end of a support member. Hinge pin holes 520, 522 are transversely bored to align with hinge pin holes in the hinge end of a support member channel. When the present invention is in the working position, the top surface 540 of the support member 500 rests against the contact surface of the support member channel. The hinge end of the support member may be angled as shown in FIG. 5, rounded, or otherwise shaped to provide hinge part clearance when the present invention is rotated between the working position and the stored position.

Figure 6:
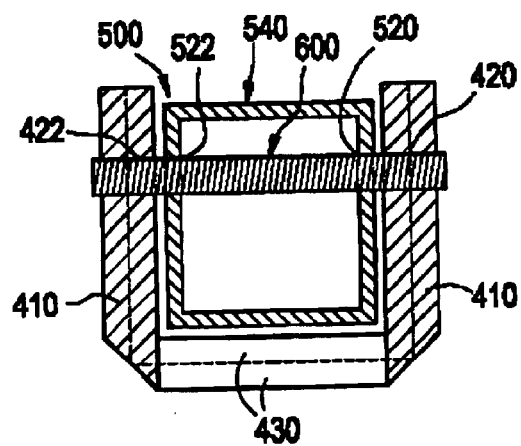
FIG. 6 shows a cross-sectional view of a preferred embodiment of a hinge in the stored position.

FIG. 6 shows a cross-sectional view of a preferred embodiment of a hinge in the stored position. A hinge pin 600 passes through hinge pin holes 422, 522, 520, 420 and is affixed to the reinforcing layers 410. When this embodiment of the present invention is moved from the stored position to the working position, the support member 500 pivots about the hinge pin 600 until the top surface 540 of the support member 500 rests against the contact surface 430.

Figure 7:
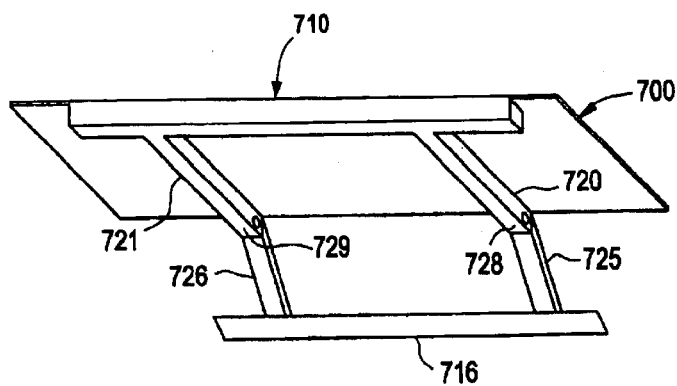
FIG. 7 shows a perspective view of the underside of an embodiment of the present invention that simplifies installation in a standard tailgate.

FIG. 7 shows a perspective view of the underside of an embodiment of the present invention that simplifies installation in a standard tailgate. A support plate 700 has a step member channel 710 and two support member channels 720, 721 press-formed into the plate. Alternatively, channel slots may be cut into the support plate 700 and channels welded onto the underside of the plate. Support members 725, 726 are attached to the support member channels 720, 721 by hinges 728, 729, and support at least one step member 716.

The channels and members of the embodiment shown in FIG. 7 are configured and function much the same as those shown in FIG. 2. However, the embodiment shown in FIG. 7 may be installed as a single unit by cutting an opening in the upper surface of a stock tailgate, the opening corresponding in size and shape to the perimeter formed by the exterior edges of the support plate 700, the step member channel 710, and the support member channels 720, 721. The embodiment of FIG. 7 is dropped into the opening and welded in place around the perimeter of the cut.

In an alternate embodiment, the opening cut into the upper surface of a tailgate may be smaller than the perimeter of the support plate 700, so that the perimeter of the support plate 700 overlaps the edges of the opening. The support plate 700 is dropped into the opening and affixed by welding, bolting, riveting, bonding, or other fastening methods known in the art.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A tailgate step, comprising:
   at least a first support member, the first support member having a first end and a second end, the second end of the first support member comprising a first portion of a first hinge;
   at least a first step member, the first step member attached to the first end of the first support member;
   at least a first support member storage channel, the first support member storage channel having a first end and a second end, at least a portion of the first support member storage channel disposed within the tailgate and operable to contain at least a portion of the first support member, the second end of the first support member channel proximate to an edge of the tailgate and comprising a second portion of the first hinge, the second portion of the first hinge including a first contact surface, the first and second portions of the first hinge pivotally engaged by a first hinge pin; and a first step member storage channel, the first step member storage channel communicating with the first end of the first support member storage channel, at least a portion of the first step member storage channel disposed within the tailgate and operable to contain at least a portion of the first step member, the first support member and the first step member pivoting about the first hinge between a working position and a stored position, the first support member contacting the first contact surface when the first support member and the first step member are in the working position, the first step member positioned between the tailgate and ground level when in the working position, at least a portion of the first step member disposed within the first step member channel when the first step member is in the stored position, at least a portion of the first support member disposed within the first support member channel when first support member is in the stored position.

2. A tailgate step as claimed in claim 1, further comprising:

a second support member, the second support member having a first end and a second end, the second end of the second support member comprising a first portion of a second hinge, the first step member attached to the second support member;

a second support member storage channel, the second support member storage channel having a first end and a second end, at least a portion of the second support member storage channel disposed within the tailgate and operable to contain at least a portion of the second support member, the first step member storage channel communicating with the first end of the second support member storage channel, the second end of the second support member channel proximate to an edge of the tailgate and comprising a second portion of the second hinge, the second portion of the second hinge including a second contact surface, the first and second portions of the second hinge pivotally engaged by a second hinge pin; and the second support member and the first step member pivoting about the second hinge between a working position and a stored position, the second support member contacting the second contact surface when the second support member and the first step member are in the working position, the first step member positioned between the tailgate and ground level when in the working position, at least a portion of the second support member disposed within the second support member channel when second support member is in the stored position.

3. A tailgate step as claimed in claim 1, wherein the first step member is rigidly affixed to the first support member.

4. A tailgate step as claimed in claim 1, wherein the first support member channel and the first step member channel comprise square metal "U" channels.

5. A tailgate step as claimed in claim 1, wherein the first contact surface is rectangular and parallel to the first support member in the working position.

6. A tailgate step as claimed in claim 2, wherein the second support member channel comprises a square metal "U" channel.

7. A tailgate step as claimed in claim 2, wherein the second contact surface is rectangular and parallel to the second support member in the working position.

8. A tailgate step as claimed in claim 1, wherein protective material is affixed to upper surfaces of the first support member and the first step member, the first support member being contained within the first support member channel while in the stored position, the first step member being contained within the first step member channel while in the stored position, the protective material being substantially flush with a tailgate surface when the first support member and the first step member are in the stored position.

9. A tailgate step as claimed in claim 2, wherein protective material is affixed to upper surfaces of the second support member, the second support member being contained within the second support member channel while in the stored position, the protective material being substantially flush with a tailgate surface when the second support member is in the stored position.

* * * * *